Figure 3:
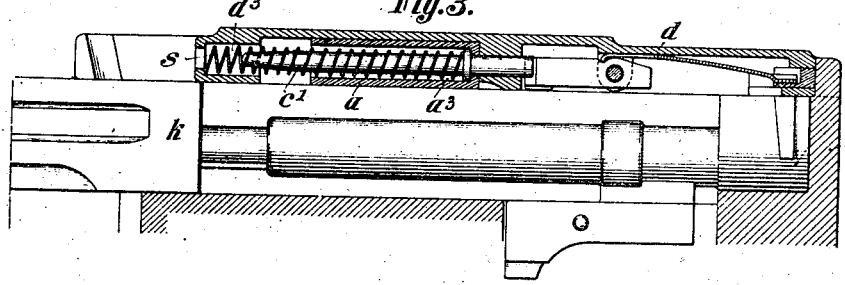

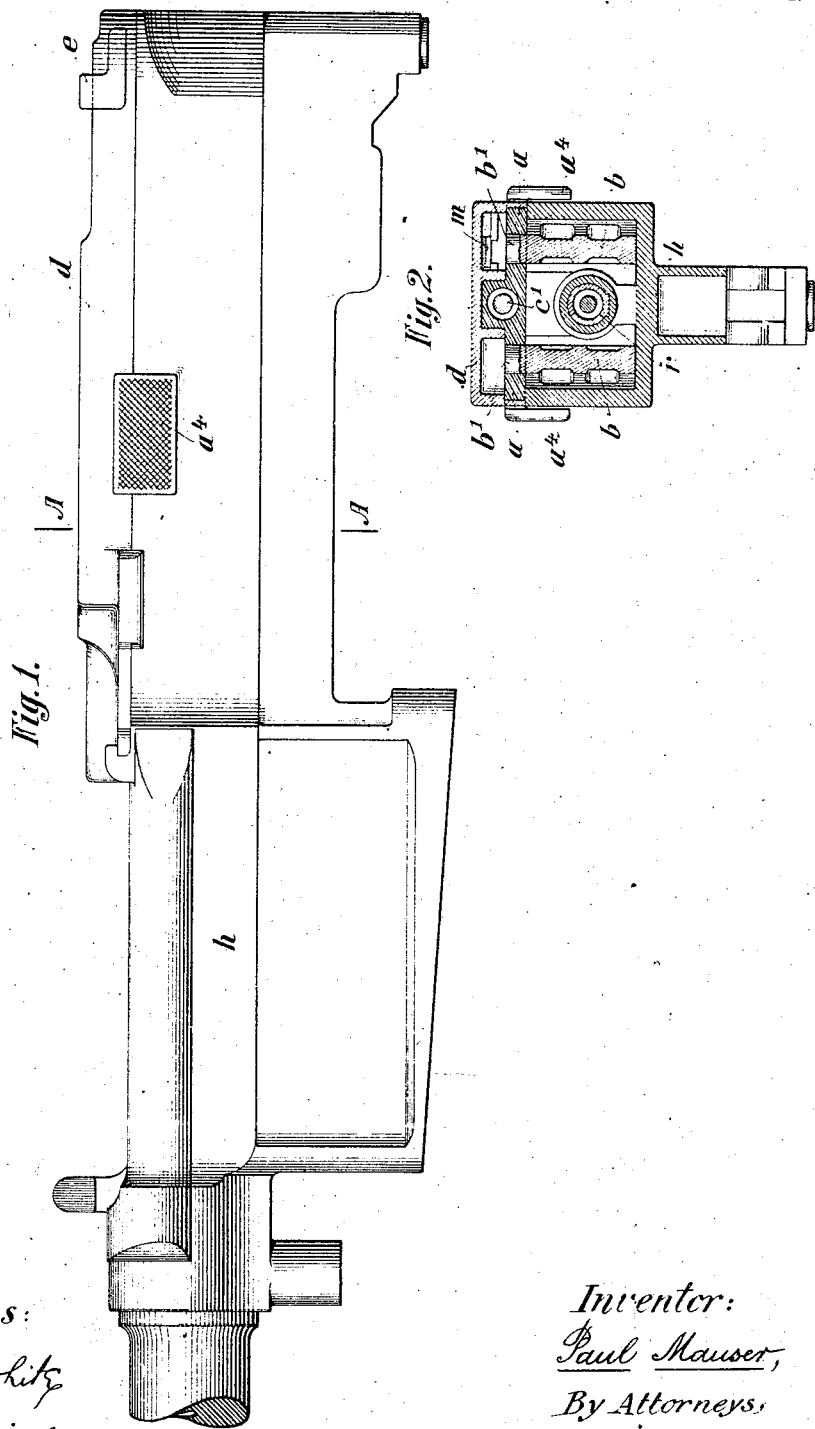

P. MAUSER.
RECOIL LOADER WITH FIXED BARREL.
APPLICATION FILED MAY 20, 1909.

971,061.

Patented Sept. 27, 1910.
8 SHEETS—SHEET 2.

Witnesses:

Inventor:
Paul Mauser,
By Attorneys,

P. MAUSER.
RECOIL LOADER WITH FIXED BARREL.
APPLICATION FILED MAY 20, 1909.
971,061.
Patented Sept. 27, 1910.
8 SHEETS—SHEET 3.
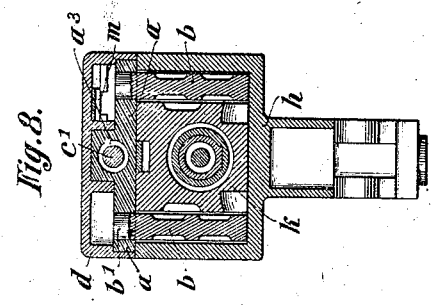
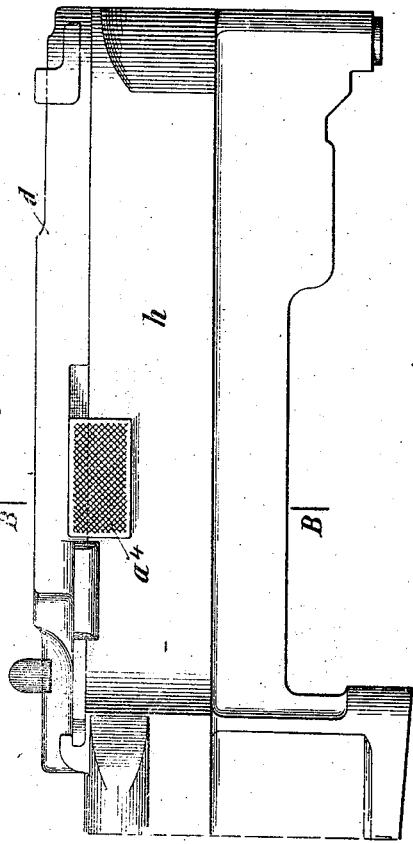
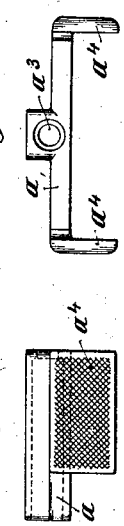
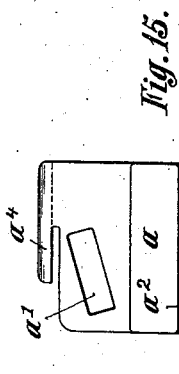
Witnesses:
Inventor:
Paul Mauser,
By Attorneys, P. MAUSER.
RECOIL LOADER WITH FIXED BARREL.
APPLICATION FILED MAY 20, 1909.
971,061.
Patented Sept. 27, 1910.
8 SHEETS—SHEET 4.
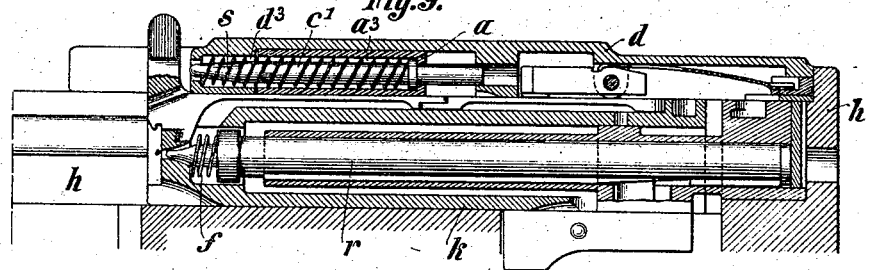
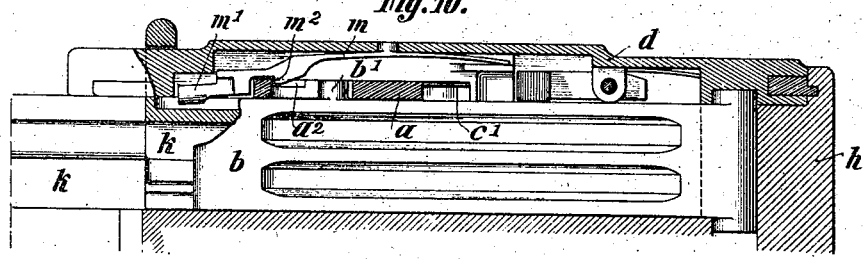
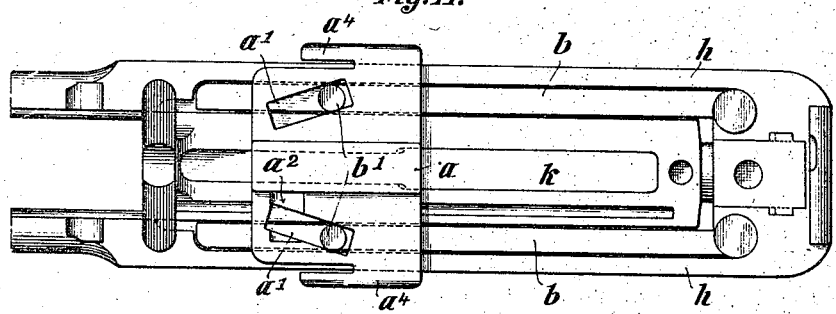
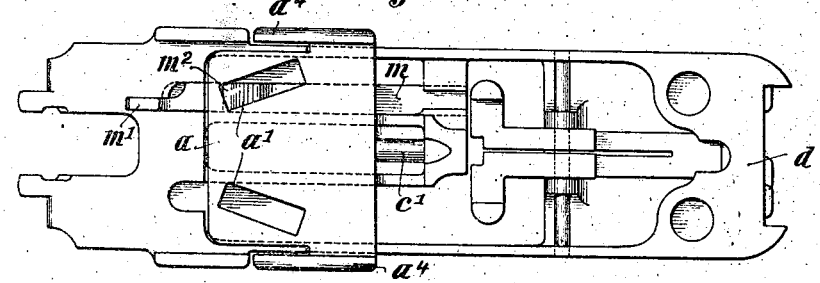
Witnesses:
Inventor:
Paul Mauser,
By Attorneys, P. MAUSER.
RECOIL LOADER WITH FIXED BARREL.
APPLICATION FILED MAY 20, 1909.
971,061.
Patented Sept. 27, 1910.
8 SHEETS—SHEET 5.
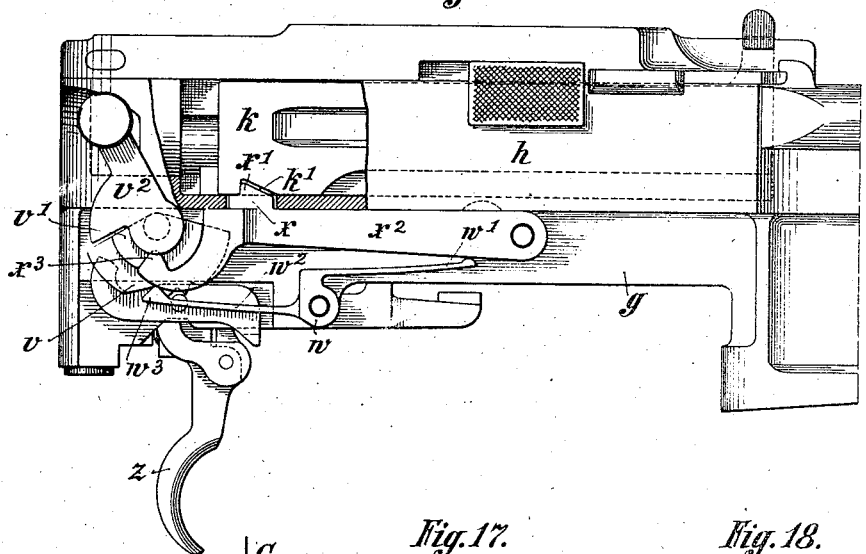
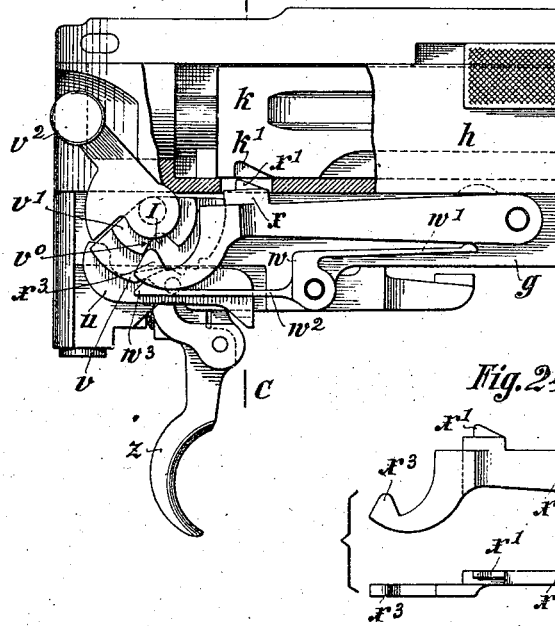
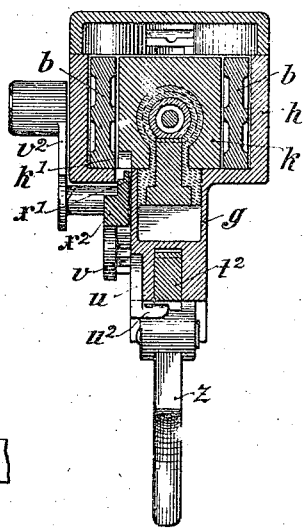
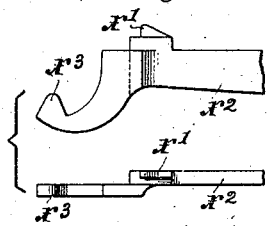
Witnesses:
Fred White
René Bruine
Inventor:
Paul Mauser,
By Attorneys,

P. MAUSER.
RECOIL LOADER WITH FIXED BARREL.
APPLICATION FILED MAY 20, 1909.

971,061.

Patented Sept. 27, 1910.
8 SHEETS—SHEET 6.

Witnesses:
Fred White
René Bruine

Inventor:
Paul Mauser,
By Attorneys,

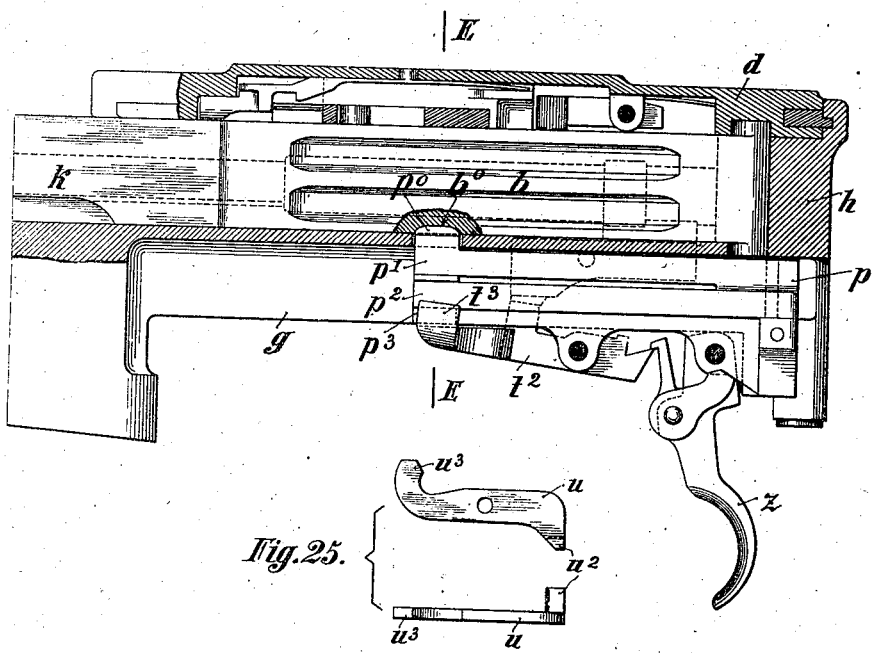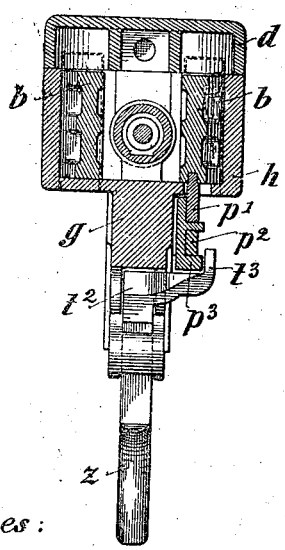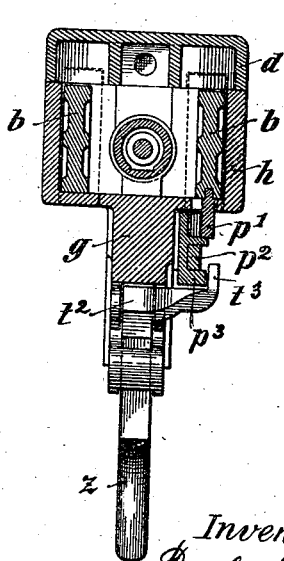

P. MAUSER.
RECOIL LOADER WITH FIXED BARREL.
APPLICATION FILED MAY 20, 1909.
971,061.
Patented Sept. 27, 1910
8 SHEETS—SHEET 8.
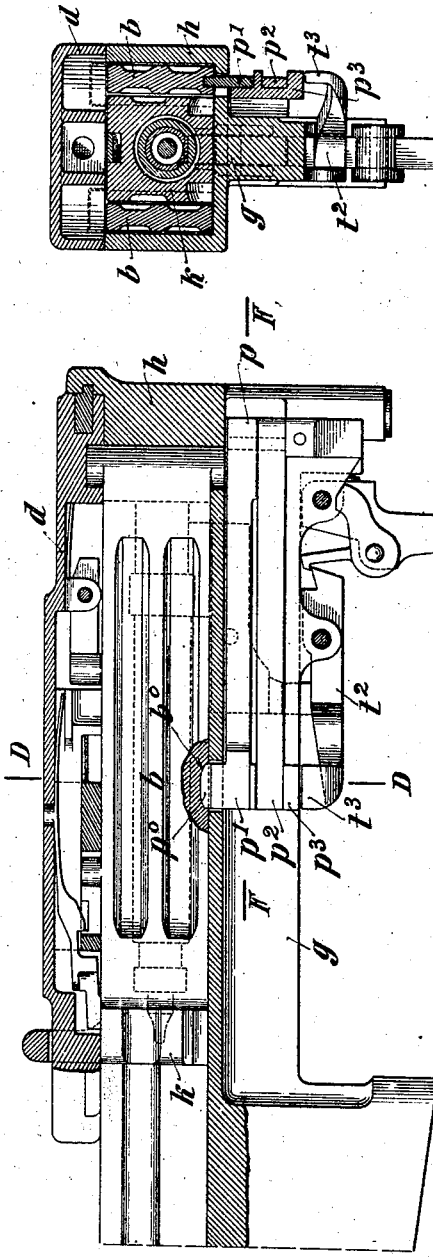

UNITED STATES PATENT OFFICE.

PAUL MAUSER, OF OBERNDORF-ON-THE-NECKAR, GERMANY.

RECOIL-LOADER WITH FIXED BARREL.

971,061.  Specification of Letters Patent.  Patented Sept. 27, 1910.

Application filed May 20, 1909. Serial No. 497,204.

*To all whom it may concern:*

Be it known that I, PAUL MAUSER, privy councilor of commerce, a subject of the German Emperor, residing at Oberndorf-on-the-Neckar, in the Kingdom of Würtemberg, Germany, have invented certain new and useful Improvements in Recoil-Loaders with Fixed Barrels, of which the following is a full, clear, and exact description.

The present invention refers to a further development of the recoil loader described in my U. S. application Ser. No. 461670 of November 9, 1908 in which the arrangement described is such that the unlocking of the breech is effected by the alteration in position of a freely moving part arranged on a fixed part of the weapon, for example on the casing of the lock, which part upon the weapon being discharged has a relative movement imparted to it by the recoil and thus starts the unlocking movement, that is to say occasions the corresponding displacement of the locking parts. For the purpose of displacing the locking part, a reciprocated part (a slide with curved or inclined slots) is arranged on the casing of the lock and is in direct coöperation with the locking parts and is provided with the control means (curved or inclined slots) for the locking parts (supporting levers) and which for its part is dependent in its movement on the alteration in position of the above mentioned freely movable arranged part (pivoted lever with weight fitting or projection).

The object of the present invention is more particularly to improve the device that has just been described, whereby the mechanism is considerably simplified, inasmuch as the above mentioned pivoted lever with weighted projection as well as also the tension and pressure gear acting on the slotted slide, which on being released drives the slide forward and thus brings the locking parts into the unlocked position, are dispensed with.

Furthermore the present invention relates to the construction of that device which renders it possible to use the weapon as a single loader.

The principle of this device, as used in former recoil loaders with movable barrel such, for example, as that described in the specification of my U. S. application Ser. No. 382935 of July 7, 1907 is also retained here, but it will be evident that when firing single shots the releasable locking part holding the breech block in the open position, after each shot, is deprived of its function with respect to the holding back of the barrel, which in the present case is arranged fixed; this locking part, however, just as previously is intermittently displaced by a special adjusting gear, for the purpose of being able to bring the same into or out of the track of the breech block as required according to whether the gun is to be used as a single loader or as a repeater. It must be remarked that it is essential in the present arrangement that the nose arranged as a locking part for the fixing of the breech block is combined with its adjusting lever to form a single part, for example, a one-arm lever, the back hook-shaped curved end of which engages around the rotary disk effecting the intermittent adjustment and is acted upon by bents and projections arranged on the circumference of the said rotary disk. The spring catch regulating the rotation of the disk is also simplified in a similar manner, inasmuch as the spring plate and the corresponding spring acting on the adjusting lever form a single part, that is a bell crank lever, the rear arm of which coöperates with corresponding bents on the circumference of a special spring disk arranged at the side of the actual rotary disk.

Finally the invention relates to the arrangement of a safety device on such a recoil loader with fixed barrel in which the locking of the breech is effected by plate-like supporting levers moving inward and outward and arranged in the sides of the casing of the lock, which supporting levers, as already explained are acted upon by the reciprocated slotted slide. Owing to this safety device the discharge of the gun in the unlocked position of the lever is prevented, so that it is absolutely impossible to discharge the gun as long as the breech is not locked.

With this object in view a special positively geared safety lever acted on by one or both locking levers is arranged in the track of the discharge device and when locking and unlocking the breech follows the movements of the locking levers and when these levers are in the unlocked position, the breech being consequently unlocked said safety lever exerts a locking action on the discharge mechanism.

Figure 4:
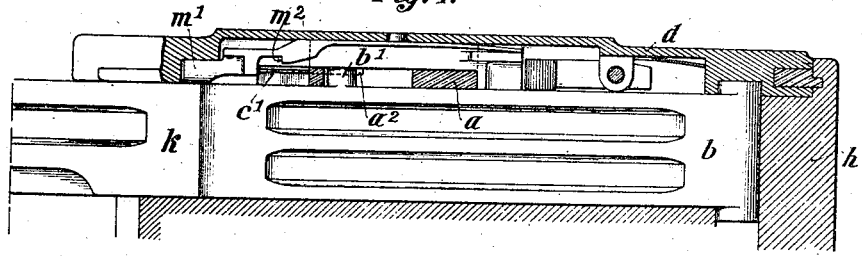
Figure 5:
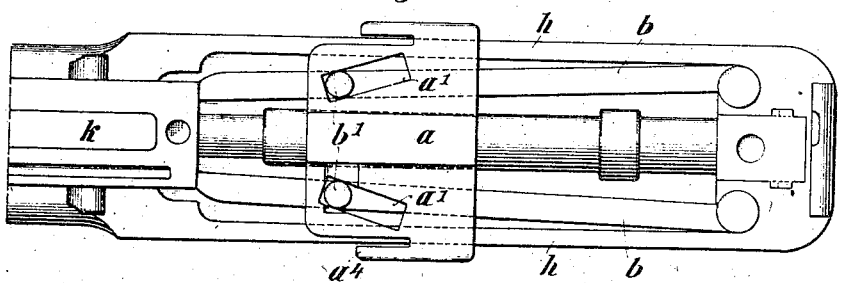
Figure 6:
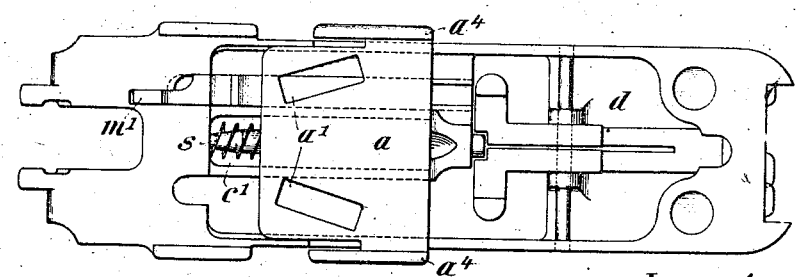
Figure 19:
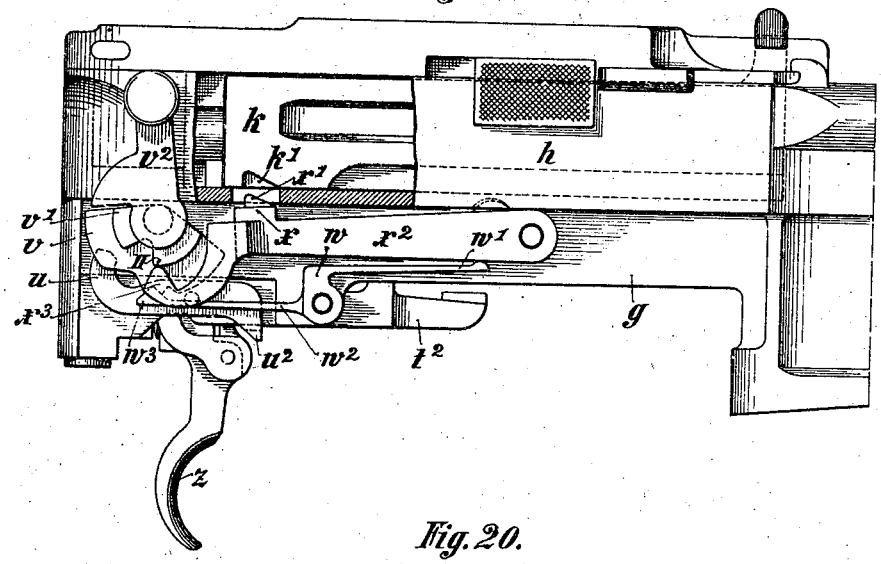
Figure 20:
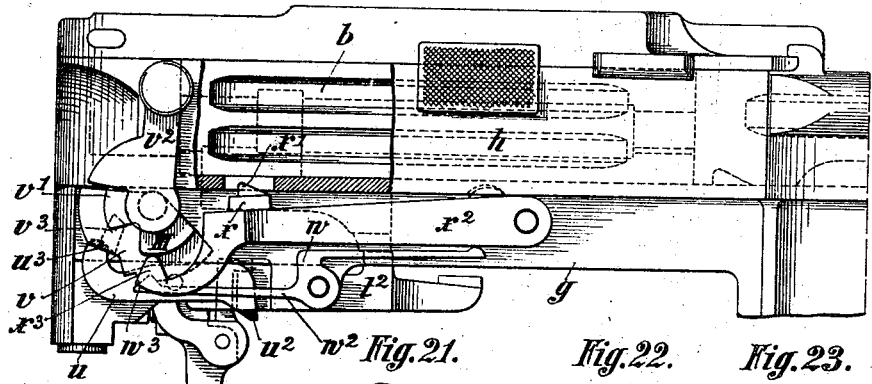
Figures 21, 22, 23:
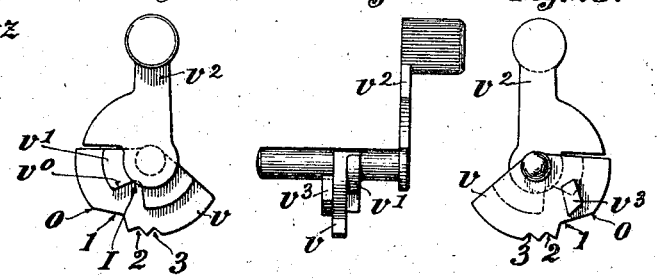

In the accompanying drawings, Figure 1 is a side view of the rear portion of the gun showing the breech locked. Fig. 2 is a vertical cross section taken on the line A—A of Fig. 1. Figs. 3 and 4 are two different longitudinal sections showing the positions of the various parts of the breech mechanism when the breech is locked. Fig. 5 is a plan or top view with the cover plate removed. Fig. 6 is an underside view of the cover plate. Figs. 7 and 8 are respectively a side view and vertical cross section on the line B—B of Fig. 7 of the rear end of the gun showing the breech open. Figs. 9 and 10 are longitudinal sections showing the positions of the various parts of the breech mechanism. Fig. 11 is a plan or top view with the cover plate removed. Fig. 12 is an underside view of the cover plate showing the position of the slotted slide when the breech is open. Figs. 13, 14 and 15 are respectively a side elevation, a front view and a plan or top view of the slotted slide separately. Figs. 16 to 25 relate to the arrangement of the adjusting device, in which—Fig. 16 shows the adjusting lever with the locking noses in position for single loading and consequently fixing the returned breech block. Fig. 17 shows the position of the parts for the instantaneous releasing of the breech block when single loading. Fig. 18 is a vertical cross section taken on the line C—C of Fig. 17. Fig. 19 shows the position of the parts of the adjusting device for repeating action, the locking noses being withdrawn from the track of the breech block. Fig. 20 shows the positions of the parts in the safety position. Figs. 21, 22 and 23 are respectively a front, side and back view of the rotary disk with its lever handle and the spring stop. Fig. 24 shows a side elevation and a plan or top view of the front end of the adjusting lever. Fig. 25 shows a side elevation and a plan or top view of the safety lever. Figs. 26 to 30 relate to the arrangement of the safety device, in which: Fig. 26 is a vertical longitudinal section showing the safety device in the working position, in which the breech block has passed back and the locking levers are in the unlocking position. Fig. 26ª is a horizontal section on the line F—F in Fig. 26. Fig. 27 is a vertical transverse section taken on the line D—D of Fig. 26. Fig. 28 is a vertical longitudinal section showing the breech in the locked condition at the moment of discharging the gun, in which consequently the unlocked trigger is actuated. Fig. 29 is a vertical transverse section taken on the line E—E of Fig. 28. Fig. 30 is a similar view to Fig. 29 illustrating the positions of the parts in the case, when while the breech is already opened the locking levers consequently having passed into the unlocking position, the trigger is still pressed on.

The general arrangement of the present breech system is similar to that described in the specification of the above mentioned U. S. application Ser. No. 461670 of November 11, 1908. In this case also the locking is effected by two positively geared locking levers $b$ $b$ supporting or abutting against the movable breech block $k$ symmetrically on both sides which locking levers extend along the inside of the breech casing $h$ and are arranged with their back ends pivoted in the back face of this casing so that they move like wings or arms and stand inward when the breech is locked and act symmetrically against the breech block $k$ and consequently bring about the locking thereof. On the other hand, however, when they stand outward after the gun has been discharged they allow the breech block $k$ thus unlocked to pass back between them.

The displacement of the locking levers $b$ $b$ is effected by the slotted slide $a$ guided in the cover $d$, in the slots $a'$ $a'$ of which slide $a$ engage the pins $b'$ $b'$ of the levers $b$ $b$. When the breech is locked, Figs. 1 to 6, the slide $a$ is in its backward position, and the pins $b'$ $b'$ are situated at the front ends of the slots $a'$ $a'$ and hold the levers $b$ $b$ inward with their faces against the rear end of the breech block (Fig. 5). When the breech is unlocked the slide $a$ is in its forward position, and the pins $b'$ $b'$ in the rear ends of the slots $a'$ $a'$ so that the levers $b$ $b$ move or spread outward, that is, pass into corresponding recesses in the side walls of the casing $h$ (Fig. 11). This fundamental method of working the slide is consequently in itself the same as in my said former specification. Now according to the improvement, however, as already mentioned, the pivoted lever with weight projection, by the alteration in position of which in the device described in my said former specification the movement of the slide is started, is dispensed with and the slide $a$ itself is movably arranged independently of other parts so that without necessitating any previous displacement of any specially provided part, owing to the action of the recoil, it can effect the movement necessary to occasion the unlocking, in the present case the forward movement.

The impulse of the slide $a$ guided as heretofore by a pin $c'$ supported in projections from the cover (said impulse being occasioned by the recoil) is sufficiently strong to easily and instantaneously overcome the pressure of the spring $s$ arranged on the pin $c'$ in the interior $a^3$ of the slide and reaching into the recess $d^3$ of the cover. The object of this spring, similarly to that described in my said former specification is to bring the slide again into the locking position after releasing the catch $m^2$. A pressure and tension gear in connection with which the previously mentioned weighted lever acted as a catch, is no longer necessary, the slide, which is held in the locking position by the spring $s$, is driven forward by the recoil, and the spring for its part so regulates the movement of the slide that the unlocking is first effected or first completed when the shot is already in front of the mouth of the barrel. In its forward unlocked position the slide is held by the catch $m^2$ snapping into the recess $a^2$ and is held in this position until the advancing breech block, which is provided with a corresponding slope or incline at its rear end, encounters the shoulder $m'$ at the front end of the locking lever $m$ and thus occasions the release of the locking part or catch $m^2$ that is to say the release of the slide, which latter then under the pressure of the spring $s$ flies back into the locking position (Fig. 5). With the present form of construction the arrangement is furthermore such that the slotted slide $a$ is provided with side outwardly projecting plate-like lugs or shoulders $a^4$ which, when single loading, may serve as handles for unlocking by hand. The displacement of the slide by hand is effected in a similar manner to the repeating action. The slide is pushed forward against the pressure of the spring, until the levers $b$ $b$ are in the outward position and then the breech block $k$ can be drawn back by hand holding the slide in its forward position. When doing so, after having drawn the block back a small part of his way, the slide is caught by the locking part, so that this slide is held by this part, and it is not necessary to further hold the slide with the hand. On pushing the breech block forward again the locking of the slide is automatically released so that as soon as the breech block is in the closed position, the locking is effected.

Now as regards the adjusting device, the one-arm adjusting lever $x^2$ is pivoted to the lower frame $g$ of the lock casing $h$, which lever $x^2$ near its back is hook shaped and carries a locking nose or projection $x'$ serving for fixing the breech block when single loading. This locking nose or projection, which is fitted to a special projection $x$ of the lever $x^2$ and has the form of a nose sloped to the front, in its catching position engages with a corresponding recess $k'$ of the breech block $k$ so that this breech block when loading by hand is held in its back position against the pressure of the closing spring. The nose $x'$ thus constructed and acting in this manner consequently constitutes together with the lever $x^2$ to which it is fitted the essential part of that adjusting device by means of which the gun can be used either as a single loader or as a repeater, and by means of which also, at the same time, as a further result, the securing of the parts from undesired discharge is effected.

For displacing the lever $x^2$ the mutilated disk or plate $v'$ is employed pivoted in its track to the back end of the frame $g$ the spindle of which disk carries the operating arm or handle $v^2$. The lever $x^2$ engages this rotary disk $v'$ with its rear hook-shaped curved end; a bent or notch I is provided on the edge of the disk in which, in the position for single loading, the nose $x^3$ of the hook-like end of the lever $x^2$ engages. Just as previously when adjusting for single loading, by a simple turning back of the disk whereby the nose $x^3$ slides downward on the incline $r'''$ of the bent I, the nose or projection $x'$ holding the breech block can be withdrawn and consequently the breech block released so as to pass forward. This operation is completed almost instantaneously by a light back pressure on the button of the handle or arm $v^2$, after the release of which, the parts (the disk $v'$, the lever $x^2$ and the nose or projection $x'$) immediately turn back again into their normal position for single loading corresponding to the bent I. The operation of thus instantaneously releasing the breech block will be understood upon reference to Fig. 17.

The adjustment for repeating action is effected by turning the lever handle $v^2$ forward until the nose $x^3$ of the adjusting lever is situated outside the bent I at the spot II of the circumference of the disk $v'$ as shown in Fig. 19. In this position the adjusting lever $x^2$ is turned so far downward that the nose or projection $x'$ is situated altogether outside the track of the breech block $k$ which consequently can freely complete its automatic opening and closing movements (Fig. 19). For bringing the safety arrangement into play the lever arm $v^2$ is turned still farther forward until, as may be seen from Fig. 20, the nose $x^3$ of the adjusting lever $x^2$ is situated at the spot III of the circumference of the disk $v'$.

The safety part consists of a double arm lever $u$ which on its front arm has an inwardly projecting shoulder or nose $u^2$ and at its back end it is curved upward or hook-shaped and this hook-shaped end projects into the track of an inner projection $v^3$ of the adjusting device. In the safety position of the arm $v^2$, the projection $v^3$ just referred to rests against the back arm $u^3$ of the lever $u$ and the lever $u$ is thereby so turned that the projection $u^2$ of the front arm is pressed firmly against the trigger bar $t^2$ and consequently prevents the latter from moving (Fig. 20).

The various positions just described of the adjusting lever for single loading, repeating and safety or the corresponding rotation of the disk $v'$ is regulated by a spring catch, which in the present form of construction consists of a spring disk $e$ arranged on the spindle of the lever arm $v^2$ beside the disk $v'$ and of the double arm spring lever $w$, the back arm $w^2$ of which engages by its nose $w^3$ in corresponding bents or notches 1, 2, 3 in the circumference of the spring disk $v$ and the front arm $w'$ of which forms the spring for the adjusting lever $x^2$. This spring disk $v$ also carries the projection $v^3$ which effects the locking of the trigger bar by acting on the lever arm $u^3$, which projection $v^3$ is fitted in the form of a special tappet at the back of this disk $v$. The bent I of the disk $v$ is correspondingly prolonged toward the back by a plane incline $o$ in order to assure the necessary play for the spring lever or its nose $w^3$ when the arm or handle $v^2$, as described, is turned back into the position shown in Fig. 17 for the purpose of instantaneously releasing the safety nose or projection $x'$, when single loading.

Now with respect to the safety device, in coöperation with the left side supporting lever $b$ there is arranged the counter lever $p$ forming the safety lever for the trigger device, this counter lever $p$ being so pivoted beneath the bottom of the lock casing to the middle frame of the handle piece $g$, that similarly to the lever $b$ itself, it carries out its movements as a one-arm lever, that is lever $p$ oscillates around its rear pivotal axis in accordance with the oscillations of supporting lever $b$. The positively geared coöperation between the lever $b$ and its safety or counter lever $p$ is effected by the following means. The lever $p$ has on top of its front end a shoulder or nose $p^0$ which engages through the bottom of the lock casing in a corresponding recess $b^0$ in the lever $b$ in such manner that between the lever $b$ and the counter lever $p$ the corresponding movement is so produced that when the lever $b$ passes outward into the unlocking position the lever $p$ is also at the same time turned outward, oscillating around its pivotal axis in its rear. In order to be able to have a locking action with respect to the trigger bar $t^2$ the lever $p$ is also provided at its front end with a lower shoulder or lug $p^3$ which, as soon as it is turned outward together with the lever $b$, comes to be situated above the front hook-like upwardly turned end $t^3$ of the trigger bar $t^2$ as shown in Figs. 26 and 27. In this manner the latter is locked against moving, so that it is impossible as long as the levers $b$ are in their outward position (the breech being thus unlocked) to actuate the trigger, that is to say to discharge the gun. In order not to disturb the regular working of the levers if after firing off the gun the trigger is still pressed on, the arrangement is such that the shoulder $p^0$ is situated on a special spring arm $p'$, which can be bent laterally with relation to the lower fixed part $p^2$ of the lever $p$. As the locking lever moves outward (as in unlocking) the lever $p$ would move outward with it. This would bring part $p^3$ of lever $p$ (the lever being moved as a whole) over $t^3$ of trigger-lever $t$ and thereby prevent the trigger from being pulled. For practical purposes the projection $p^0$ of the lever $p$ is mounted on a spring-arm $p'$ constituting a part of the lever, the spring-arm being free at its front end and connected at its rear end. This allows the projection $p^0$ to yield (and thereby not be sheared off) when the locking lever moves outwardly and the pressure on the trigger is maintained. Of course, as soon as the trigger is released, the spring-arm $p'$ would draw the arm $p^2$ over to it and thereby bring the part $p^3$ over the part $t^3$ connected with the trigger. Consequently if after discharging the gun the trigger is still pressed on and thus the hook $t^3$ of the trigger bar $t^2$ is held beside the part $p^2$ and this latter part $p^2$ is locked from moving, the supporting levers are not thereby prevented from passing outward into the unlocking position as must regularly occur after the discharge of the gun. In this case although the fixed part $p^2$ is prevented by the still upwardly standing projection $t^3$ of the trigger bar $t^2$ from side movement the upper spring arm $p'$ of the lever can pass outward with the lever $b$ as shown in Fig. 30. In this manner it is possible to avoid any disturbing action of the fixed counter-lever on the outwardly pivoting supporting lever.

What I claim as my invention and desire to secure by Letters Patent is:

1. In a recoil operated breech-loading firearm, the combination of a breech-block, locking levers for said breech-block, and a cam plate freely mounted upon the firearm and operating by inertia to actuate said locking-levers to unlock the breech-block upon recoil of the firearm.

2. In a recoil operated breech-loading firearm, the combination of a breech-block, locking levers for said breech-block, and a device engaging said locking-levers freely mounted upon the firearm and operating by inertia to actuate said locking-levers to unlock the breech-block upon recoil of the firearm.

3. In a recoil operated breech-loading firearm, the combination of a breech-block, locking-levers pivoted at one end to the breech-casing and engaging said breech-block to lock the same, and means freely mounted on the firearm and operating by inertia to actuate said locking-levers to unlock the breech-block upon recoil of the firearm.

4. In a recoil operated breech-loading firearm, the combination of a breech-block, inwardly and outwardly oscillating pivoted locking-levers for said breech-block, and a cam plate freely mounted upon the firearm and operating by inertia to actuate said locking-levers to unlock the breech-block upon recoil of the firearm.

5. In a recoil operated breech-loading firearm, the combination of a breech-block, locking levers for said breech-block, and a cam plate freely mounted upon the firearm and operating by inertia to actuate said locking-levers to unlock the breech-block upon recoil of the firearm, and means for returning said slotted plate to its initial position to actuate said levers to lock the breech-bolt.

6. In a recoil operated breech-loading firearm, the combination of a breech-block, locking levers for said breech-block, and a cam plate freely mounted upon the firearm and operating by inertia to actuate said locking-levers to unlock the breech-block upon recoil of the firearm, and automatic means for returning said cam plate to its initial position to actuate said levers to lock the breech-bolt.

7. In a recoil-operated breech-loading firearm, the combination of a breech-block, locking-levers therefor, means for actuating said locking-levers upon recoil to unlock the breech-block, and means regulating the closing movements of the breech-block, comprising a lever having a nose or projection thereon for engaging the breech-block, and means regulating the engagement of said lever with said breech-block.

8. In a recoil-operated breech-loading firearm, the combination of a breech-block, locking-levers therefor, means for actuating said locking-levers upon recoil to unlock the breech-block, and means regulating the closing movements of the breech-block, comprising a part having a series of indentations therein, and a lever having a nose or projection thereon for engaging the breech-block and a part for engaging in the indentations in said disk.

9. In a recoil-operated breech-loading firearm, the combination of a breech-block, locking-levers therefor, means for actuating said locking-levers upon recoil to unlock the breech-block, and means regulating the closing movements of the breech-block, comprising a part having two series of indentations therein, a lever having a nose or projection thereon for engaging the breech-block and a part for engaging in one series of the indentations in said indented part, and a two-arm spring, one arm of which engages said lever and the other arm of which engages the other series of indentations in said indented part.

10. In a recoil-operated breech-loading firearm, the combination of a breech-block, locking-levers therefor, means for actuating said locking-levers upon recoil to unlock the breech-block, firing mechanism comprising a trigger, and means automatically locking the trigger when the breech-block is in its open position, comprising a lever connected to one of the locking levers and having a part engaging a part of the trigger mechanism.

11. In a recoil-operated breech-loading firearm, the combination of a breech-block, locking levers therefor, means for actuating said locking-levers upon recoil to unlock the breech-block, firing mechanism comprising a trigger, and means automatically locking the trigger when the breech-block is in its open position, comprising a lever connected to the trigger, and a lever having a nose or projection engaging one of the locking levers and a part engaging said trigger-lever.

12. In a recoil-operated breech-loading firearm, the combination of a breech-block, locking-levers therefor, means for actuating said locking-levers upon recoil to unlock the breech-block, firing mechanism comprising a trigger, and means automatically locking the trigger when the breech-block is in its open position, comprising a lever having a spring-arm attached thereto, a nose or projection on said spring-arm and engaging one of said locking-levers, and a part engaging a part of the trigger mechanism.

13. In a recoil-operated breech-loading firearm, the combination of a breech-block, locking-levers therefor, a cam plate freely mounted upon the firearm and operating to actuate said locking-levers to unlock the breech-block upon recoil, means regulating the closing movement of the breech-block comprising two disks having a series of indentations therein, a lever having a projection engaging the breech-block and a part engaging the indentations in one of said disks, and a two-arm spring, one arm of which engages said lever and the other arm of which engages the indentations in the other of said disks, firing mechanism comprising a trigger, and means automatically locking the trigger when the breech-block is in its open position, said means comprising a lever having a spring-arm attached thereto, a projection on said spring-arm engaging one of the locking-levers, and a part engaging a part of the firing mechanism.

In witness whereof, I have hereunto signed my name in the presence of two subscribing witnesses.

PAUL MAUSER.

Witnesses:
WOLDEMAR HAUPT,
HENRY HASPER.